United States Patent Office 3,028,309
Patented Apr. 3, 1962

3,028,309
PROCESSES FOR PRODUCING L-GLUTAMIC
ACID FROM CARBOHYDRATES
Yoshito Takeda, Tokyo, Toshinori Matsui, Kumamoto-ken, and Hiroshi Okada, Tokyo, Japan, assignors to Ajinomoto Kabushiki Kaisha and Sanraku Distillers Co., Inc., both of Tokyo, Japan, and corporations of Japan
No Drawing. Filed Mar. 10, 1961, Ser. No. 94,693
3 Claims. (Cl. 195—47)

This invention relates to processes for producing L-glutamic acid from carbohydrates.

This application is a continuation-in-part of application, Serial No. 723,984, filed March 26, 1958, now abandoned.

More particularly, the invention contemplates a process for producing L-glutamic acid by employing *Bacillus megatherium* American Type Culture Collection accession number 13402 from starch, starchy materials, glucose, sucrose, fructose, maltose, hydrolyzed starch or starchy materials, molasses, milk serum and other carbohydrates, by inoculating said organism while in spore stage into a nutrition medium prepared by adding a nitrogen source such as ammonium chloride, ammonium sulphate, ammonium nitrate, ammonium oxalate, sodium nitrate, potassium nitrate, urea and corn steep liquor and other nutrients to a material containing carbohydrates as described above and cultivating said organism. An object of the invention is to obtain a high yield of L-glutamic acid from carbohydrates by utilizing the characteristic of said organism whereby strong enzyme activity is produced when vegetative cells are grown and propagated from spores.

L-glutamic acid is used widely as a seasoning material and is being produced at present practically entirely from vegetable protein by acid decomposition or by recovery from molasses or beet sugar. It is, however, known that glutamic acid is produced in various plants and animals as a metabolic intermediate during metabolism and attempts have been made recently to produce L-glutamic acid by fermentation utilizing the metabolic activity of microorganisms.

In known processes, $\alpha$-ketoglutaric acid is used mainly as a substrate for the production of L-glutamic acid. These processes include two steps: a first fermentation step wherein $\alpha$-ketoglutaric acid is produced from sugar through the so-called "Kreb's cycle" by the action of Pseudomonas or some other organism, and a second fermentation step wherein L-glutamic acid is produced from $\alpha$-ketoglutaric acid by the use of Escherichia coli or some other organism. In the first fermentation step noted above, it is necessary to carry out active aeration while the second fermentation step is anaerobic and requires a fairly long period. The industrialization of such processes is not easy.

The production of L-glutamic acid directly from saccharine materials without using the two-step method described above would be very advantageous industrially. However it is hard to accumulate L-glutamic acid abundantly in the medium in which it is produced since it is apt to be converted immediately to some other material.

In the two-step fermentation described above, the process for producing L-glutamic acid from $\alpha$-ketoglutaric acid in the second step brings about a well defined result. In the processes for producing L-glutamic acid directly from saccharine material, however, there are a variety of metabolic proceedings and it is not easy to limit these proceedings to that which serves to produce L-glutamic acid. It is an object of the invention to provide a technique whereby L-glutamic acid can be produced in a single step directly from starchy or saccharine material and, to this end, the invention proposes that fermentation be carried out in a medium wherein *Bacillus megatherium*, American Type Culture Collection accession number 13402, is grown and propagated from spores.

The new strain indicated above has a very strong productive activity and is capable of producing large yields of L-glutamic acid steadily under certain conditions hereinafter explained. The strain is one of the varieties of *Bacillus megatherium* but is different from strains heretofore known both in size and activity of gelatin liquefaction. This new strain has been separated from soil in Kanagawa Prefecture in Japan, and the bacteriological characteristics of the strain are as follows:

A. Morphological Character (1) *Spores.*—Formed about 24 hours after incubation, ellipsoidal or oval, reddish stained by fuchsin, central to eccentric, size 1.6 by 2.6 microns.

(2) *Sporangia.*—Ellipsoidal to cylindrical, singly and in short chains.

(3) *Vegetative cells.*—Large rods, singly and in short chains, young cells motile with pertricous flagella, granules formed in cells with age. Free spores formed in old cultures, stained unevenly (vacuolated) with dilute stains. Forms variable with the medium and method of cultures. Size of majority 2.4 to 2.9 by 5.4 to 10.6 microns.

(4) *Gram stain.*—Positive.

B. Cultural Character (1) *Bouillon.*—30° C., 24 hours, abundant, heavy uniform turbidity. Scanty gray-white sediment.

(2) *Glucose bouillon agar plates.*—30° C., 24 hours, translucent edge, central milky white, circular colonies, lustrous and slightly slimy, convex, concentrically ridged and butyrous at older age.

(3) *Bouillon agar slant.*—30° C., 24 hours, growth abundant along stroke, dull lustrous, opalescent, cream-white, at younger age. Browning and more lustrous with pellucid dots with age, which becomes yellowish at older age.

(4) *Potato plates.*—30° C., 24 hours, growth abundant along stroke, spreading, lustrous, unbonate, cream-yellow; more yellowish away from center, opalescent, slightly ridged at older age.

(5) *Coagulation of milk.*—30° C., 48 hours, slowly coagulated, clear supernatant.

(6) *Gelatin stab.*—25° C., 24 hours, crateriform liquefaction.

C. Physiological Character (1) *Optimum temperature.*—30° C., growing range 42° to 45° C.

(2) *Optimum pH.*—6.0 to 8.0, growth range 5.0 to 9.0.

(3) *Acid from carbohydrates.*—

+: Arabinose, xylose, glucose, fructose, sucrose, maltose, dextrin, mannose, raffinose, lactose, galactose, melibiose, glycerol, gellobiose, glycogen.
±: Inulin, salcin, mannitol.
—: Rhamnose, inositol, sorbitol, dulcitol, $\alpha$-methylglucoside.

(4) *Acetoin.*—Not formed.
(5) *Catalase.*—Positive.
(6) *Uric acid hydrolysis.*—Positive.
(7) Nitrites produced or not produced from nitrates.
(8) Citrates used as sole source of carbon.

In the production of L-glutamic acid by fermentation using this strain, it is important to note that the productive activity of the strain is greatly varied according to the method of cultivation of the seed. The applicants have made many tests in this regard and have conducted the following investigation:

The above strain was inoculated into a nutrient broth (composition: glucose 1%, meat extract 1%, peptone 1%, NaCl 0.5%) and was cultivated at 30° C. for 20 hours. Abundant propagation was obtained. This seed culture was transferred to a fermentation medium (composition: glucose 2%, NaNO$_3$, 1%, KH$_2$PO$_4$ 0.1%, MgSO$_4$7H$_2$O 0.05%, corn steep liquor 0.2%, pH7) and was cultivated at 30° C. with shaking. In this case, despite the abundant propagation, the production of L-glutamic acid was small, the value being less than 0.1 g. per 100 cc. of fermented liquor. The seeds used in this test were vegetative cells which had not yet reached the stage of forming spores.

In another test, the strain cultivated in the nutrient broth described above was injected into soil which was taken from a garden and was sterilized by steaming under pressure, and was preserved for ten days to allow a plentiful formation of spores. These spores were used in the main fermentation. In this second test, not only was the propagation abundant but also the production of L-glutamic acid was great, the value being 0.7 g. per 100 cc. of fermented liquor.

In other tests, the strain cultivated for more than 72 hours in the fermentation medium described above or the strain cultivated and preserved on nutrient agar for a longer time were used as seeds and good results were obtained similar to those obtained for the strain preserved in soil.

In all these tests, the seeds were used when they were substantially entirely in the spore stage. These tests showed that the production of L-glutamic acid is very small when the vegetative cells are the starting seed culture but production is substantially increased when the seed is used in the spore stage.

In other words, it has been confirmed that the strain can form the enzymes necessary for producing L-glutamic acid in abundance only when spores are used as the starting seed culture.

It has also been confirmed that the above characteristic of the strain (i.e., the characteristic of powerful activity for producing L-glutamic acid when the strain is inoculated in the spore stage) does not depend on the kind of medium into which it is inoculated and in which it is cultured for the production of L-glutamic acid. The only essential condition is that the strain be inoculated into the medium after it is fully cultured or preserved in a medium (which may be sand, soil, extract of soil, nutrient broth with or without sugar, nutrient broth agar, fermentation medium or fermentation medium agar) until the formation of spores is fully effected.

In contrast thereto, when the seed is taken from its medium before spores have sufficiently formed, the production of L-glutamic acid is always very small.

In ordinary bacterial fermentation, it is conventional to use young and active vegetative cells as the seed, and the use of spores as the inoculum of the main fermentation is not usual. Accordingly, the fermentation of this invention whereby the microorganism in the spore stage is used as the seed is entirely different from prior practice in the fermentation industry.

As to the inoculation of spores of the above strain into a medium having glucose or sucrose as the substrate, there has been considered optimum quantities of various nutrients such as nitrogenous materials, phosphates, potassium salts and magnesium salts, as well as the proper value of initial pH and how to maintain an optimum value thereof to obtain L-glutamic acid at a high yield.

The applicants have considered conditions for the carbohydrates which are used industrially, these including starch, starchy materials such as sweet potato, cake of starch, corn, kaolin, wheat and others and saccharine materials such as glucose, sucrose, fructose, maltose, hydrolyzed starch or starchy materials, molasses, milk serum and others. The nitrogenous materials used industrially include ammonium chloride, ammonium sulphate, ammonium nitrate, sodium nitrate, potassium nitrate, ammonium oxalate, urea, corn steep liquor and others.

More particularly, it has been found that in fermentation using the said organism under conventional conditions wherein the range of temperature and pH are from 25° C. to 35° C. and from 6 to 8 respectively with aeration throughout or in the initial stage, if the seed is used in the form of spores, steady and abundant yields of L-glutamic acid can be obtained irrespective of the selection of the raw materials described above.

If, however, the culture is started in the vegetative cell stage, the yield is always small and unstable. Accordingly, it has been concluded that the use of seed in the spore stage is an essential condition in fermentation using the above specified organism.

As to the recovery of the L-glutamic acid produced in the fermentation liquor, it is separated and refined by conventional methods comprising of ion exchange treatment, evaporation, crystallization and separation. According to this invention, L-glutamic acid can be produced industrially much more economically than with the conventional processes known heretofore.

Some examples will next be described below:

EXAMPLE 1

A solution of 5 liters was prepared by dissolving the following chemicals in tap water:

| | |
|---|---|
| Glucose | g-- 200 |
| NH$_4$NO$_3$ | g-- 50 |
| KH$_2$PO$_4$ | g-- 5 |
| MgSO$_4$7H$_2$O | g-- 2 |
| Casein hydrolyzates | cc-- 5 |

The solution was sterilized and cooled. To this solution were added 50 g. of separately sterilized calcium carbonate. The mixture was charged into a small glass fermentor of 10 liters volume, and 10 g. of soil culture of *B. megatherium*, American Type Culture Collection accession number 13402, was inoculated into the same. The vessel was maintained at 30° C. with agitation of 300 r.p.m. for 50 hours, while air was passed thereby at a rate of 5 l./min. The fermentation was continued for 40 hours under intermittent agitation without aeration. L-glutamic acid was obtained at a yield of 30% on the basis of sugar contained in the fermentation medium.

EXAMPLE 2

| | |
|---|---|
| Hydrolyzed starch containing 4 kg. of glucose | |
| NaNO$_3$ | kg-- 1.5 |
| KH$_2$PO$_4$ | g-- 100 |
| MgSO$_4$7H$_2$O | g-- 50 |
| Corn steep liquor | g-- 50 | were dissolved in tap water to make 100 l. of solution and the pH of the solution was adjusted to 7.0 by NaOH. The solution was placed in a small fermentor of 150 l. volume made of stainless steel provided with aeration coils and agitation blades rotatable at a rate of 200 r.p.m. After the solution was sterilized and cooled, 5.0 l. of seed culture of *B megatherium*, American Type Culture Collection accession number 13402, which had been caused to form spores sufficiently by preservation after cultivation at 30° C. for 72 hours in the medium described above, was inoculated into the same, and cultivation was carried on at 30° C. for 60 hours with agitation while air was passed into the vessel at a rate of 100 liters per minute and the pH was maintained at 7.0 by adding NaOH every 6 hours.

After the fermentation was completed, the fermented broth was subjected to conventional ion exchange treatment, evaporation and crystallization and then 1.01 kg. of L-glutamic acid crystals were isolated from the broth. By conventional method, it was identified to be L-glutamic acid.

What is claimed is:
1. A process for producing L-glutamic acid directly from carbohydrates by fermentation comprising inoculating Bacillus megatherium ATCC No. 13402 in the spore stage into a medium containing carbohydrates and nitrogenous materials and culturing the same at a pH of from 6 to 8 with aeration at least in the initial stage of the process, thereby producing and accumulating L-glutamic acid, and then recovering the L-glutamic acid from the broth.

2. A process according to claim 1, wherein the carbohydrates of the medium comprise at least one of carbohydrates selected from the group consisting of starch, natural starchy materials, glucose, sucrose, fructose, maltose, hydrolyzed starch or hydrolyzed natural starchy materials, molasses and milk serum.

3. A process according to claim 1 wherein the nitrogenous materials comprise at least one of the group consisting of ammonium chloride, ammonium sulphate, ammonium nitrate, ammonium oxalate, sodium nitrate, potassium nitrate, and urea.

References Cited in the file of this patent

UNITED STATES PATENTS

| 2,789,939 | Kita | Apr. 23, 1957 |
| 2,798,839 | Huang et al. | July 9, 1957 |

OTHER REFERENCES

Journal of Biological Chemistry, vol. 187 (1950), pp. 439 to 451, 821 to 830.

Proceedings of the International Symposium on Enzyme Chemistry, Tokyo and Kyoto 1957, pp. 464 to 484, published 1958, Marzuen, Tokyo.

Chemical Abstracts, 1957, vol. 51, pp. 7643–7644.